US007866149B2

(12) United States Patent
Brinkman et al.

(10) Patent No.: US 7,866,149 B2
(45) Date of Patent: Jan. 11, 2011

(54) SYSTEM AND METHOD FOR RAPIDLY SHAKING AN IMPLEMENT OF A MACHINE

(75) Inventors: Jason L. Brinkman, Peoria, IL (US); Jeffrey L. Kuehn, Metamura, IL (US)

(73) Assignee: Caterpillar Inc, Peoria, IL (US)

( * ) Notice: Subject to any disclaimer, the term of this patent is extended or adjusted under 35 U.S.C. 154(b) by 618 days.

(21) Appl. No.: 11/850,464

(22) Filed: Sep. 5, 2007

(65) Prior Publication Data

US 2009/0056322 A1 Mar. 5, 2009

(51) Int. Cl.
*F16D 31/02* (2006.01)

(52) U.S. Cl. .......................................... 60/378; 60/468

(58) Field of Classification Search .................. 60/378, 60/468

See application file for complete search history.

(56) References Cited

U.S. PATENT DOCUMENTS 3,434,283 A * 3/1969 Piret .......................... 60/378
4,779,416 A 10/1988 Chatterjea et al.
5,235,809 A 8/1993 Farrell
5,765,594 A 6/1998 Collins et al.
6,029,445 A 2/2000 Lech
6,725,105 B2 4/2004 Francis et al.
6,757,992 B1 7/2004 Berger et al.
6,763,661 B2 7/2004 Tabor et al.
6,895,319 B2 5/2005 Alexander et al.
7,062,350 B2 6/2006 Peterson
7,114,747 B2 10/2006 Dix et al.
7,117,952 B2 10/2006 Bares et al.
2005/0203691 A1 9/2005 Kim
2006/0248885 A1 11/2006 Buckmier et al.
2007/0039457 A1 2/2007 Vigholm et al.

* cited by examiner

*Primary Examiner*—F. Daniel Lopez
(74) *Attorney, Agent, or Firm*—Leydig, Voit & Mayer

(57) ABSTRACT

A fluid system for use with a machine that employs an actuator, that provides for rapid shaking of an implement. The fluid system includes a source for providing fluid flow to the actuator and an operator input device for enabling an operator to control the movement of the implement by inputting a plurality of commands that specify movement of the implement. A controller is provided for monitoring the commands received from the operator input device and entering a mode for controlling the displacement of the source when the controller detects a pattern of commands that indicates an operator-request for rapid movement of the implement.

20 Claims, 4 Drawing Sheets

SYSTEM AND METHOD FOR RAPIDLY SHAKING AN IMPLEMENT OF A MACHINE

TECHNICAL FIELD

This patent disclosure relates generally to a hydraulic system and, more particularly, to a hydraulic system for use in a machine that employs an implement.

BACKGROUND

Many machines use hydraulic actuators to accomplish a variety of tasks, such as moving an implement. Examples of such machines include, without limitation, dozers, loaders, excavators, motor graders, and other types of heavy machinery. The hydraulic actuators in such machines are linked via fluid flow lines to a pump associated with the machine to provide pressurized fluid to the hydraulic actuators. Chambers within the various actuators receive the pressurized fluid in controlled flow rates in response to operator demands or other signals. The pump can be a load-sense hydraulic pump that, in response to the magnitude of the load acting on the implement, automatically varies the flow rate of the pressurized fluid. For example, when the implement encounters a heavy load, the load-sense hydraulic pump provides a correspondingly high flow rate to the hydraulic actuators. Likewise, when the implement encounters a small or light load, or when no load acts on the implement, the load-sense hydraulic pump provides a correspondingly low flow rate to the hydraulic actuators.

Oftentimes, after completing a task and when no load is acting on the implement, an operator may desire to dislodge dirt, mud, clay, or debris from the implement. To do so, the operator may quickly cycle a control lever back and forth, causing the hydraulic actuators to expand and retract, thereby moving the implement back and forth in rapid succession. This is sometimes referred to as rapid shakeout, or rapid sharing of the implement. However, because rapid shakeout is desired and typically occurs when no load is acting on the implement, e.g., when the bucket is substantially empty and when the load-sense pump is providing pressurized fluid to the actuators at a low flow rate, the actuators can respond slowly to the operator's commands.

Several known hydraulic systems having a load-sense pump have been adapted for accommodating rapid shakeout. One exemplary fluid system is disclosed in U.S. Pat. No. 5,235,809 for a Hydraulic Circuit for Shaking a Bucket on a Vehicle, filed on Sep. 9, 1991, and issued to Robert G. Farrell on Aug. 17, 1993 ("Farrell"). Fluid systems, such as disclosed in Farrell, include an implement such as a bucket operated by a hydraulic actuator, a directional valve for controlling fluid flow from a load sensing variable displacement pump, and a hydraulic bucket shake circuit. In this type of system, when an operator desires a rapid shakeout, the operator manually activates the hydraulic bucket shale circuit, which forces the pump to a maximum displacement condition. In this condition, the pump provides standby pressure and fluid flow to the hydraulic actuator by way of the directional valve so that the hydraulic actuator can rapidly expand and retract to rapidly shaking the bucket. However, it is a shortcoming to this system that manual activation is required for operation of the hydraulic bucket shake circuit. An additional shortcoming is that the hydraulic bucket shake circuit is a binary circuit that is either off or on for forcing the pump to a maximum displacement condition. This design can waste fuel and subjects the machine, including the pump and the engine, to unnecessary wear.

It should be appreciated that the foregoing background discussion is intended solely to aid the reader. It is not intended to limit the disclosure or claims, and thus should not be taken to indicate that any particular element of a prior system is unsuitable for use, nor is it intended to indicate any element to be essential in implementing the examples described herein, or similar examples.

BRIEF SUMMARY

The disclosure describes, in one aspect, a fluid system for use with a machine that employs an actuator that provides for rapid shaking of an implement. The fluid system includes a source for providing fluid flow to the actuator and an operator input device for enabling an operator to control the movement of the implement by inputting a plurality of commands that specify movement of the implement. A controller is provided for monitoring the commands received from the operator input device and entering a mode for controlling the displacement of the source when the controller detects a pattern of commands that indicates an operator-request for rapid movement of the implement.

The disclosure describes, in another aspect, a method of controlling the displacement of a source in a machine for providing a fluid flow to an actuator that provides for rapid movement of an implement. The method includes establishing an indicator characterized by a pattern of input commands that indicate a request for rapid movement of the implement. The method also includes monitoring a user-input device for the indicator and, after identifying the indicator, initiating a mode to control the displacement of the source for providing the fluid flow to the actuator that provides for rapid movement of the implement.

DETAILED DESCRIPTION

This disclosure relates to a system and method for controlling a flow of hydraulic fluid in a hydraulic system of a machine. In particular, a controller applies one or more modes to control a rate of flow of hydraulic fluid to an actuator in the machine when an operator requests rapid shaking of an implement. This rapid shaking can, for example, dislodge mud, dirt, clay or debris from the implement.

Figure 1:
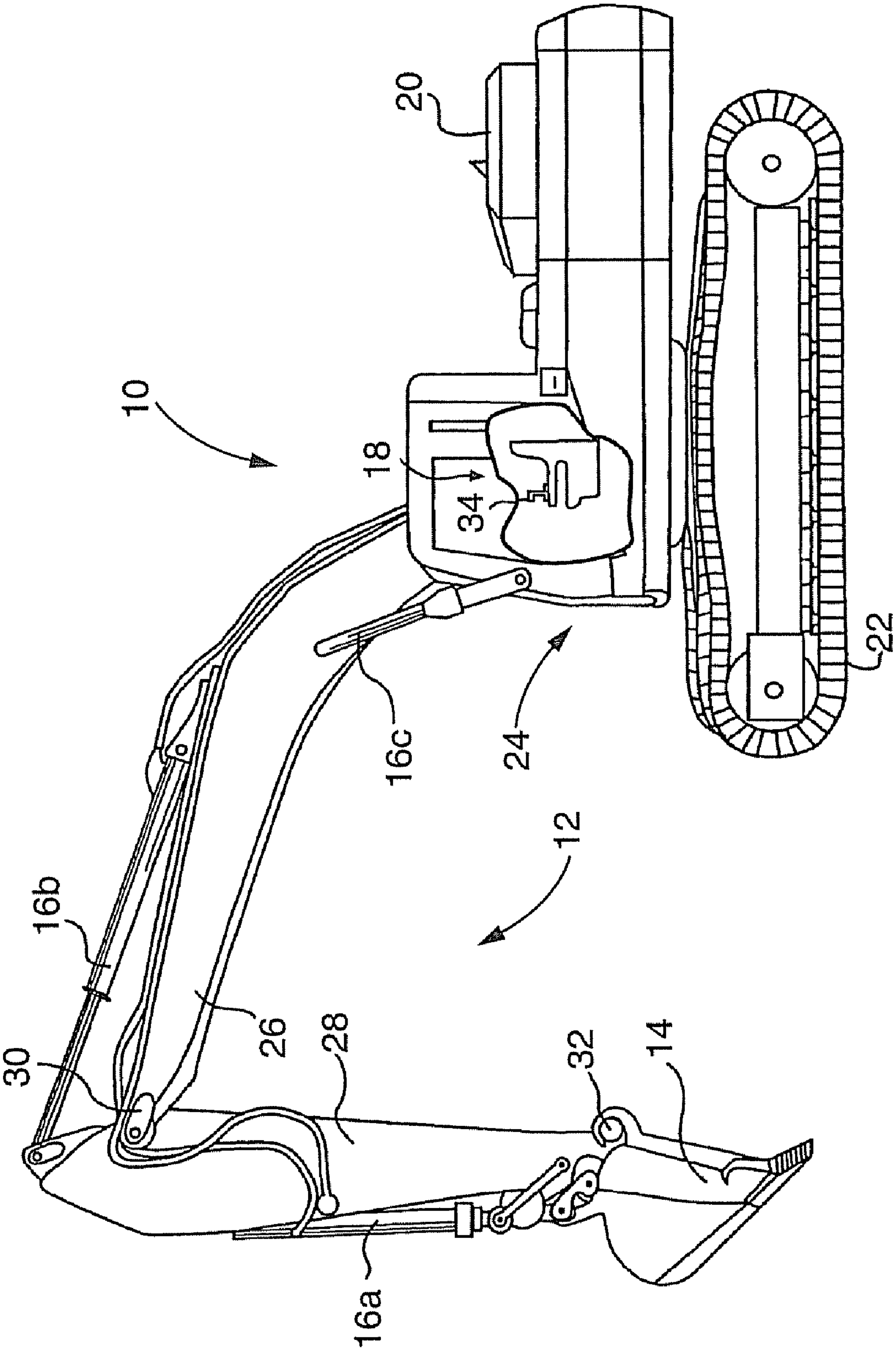
FIG. 1 is a schematic side view of an exemplary machine.

FIG. 1 illustrates an exemplary machine 10. The machine 10 may be a fixed or mobile machine that performs an operation associated with an industry such as, for example mining, construction, farming, or transportation. For example, the machine 10 may be an earth moving machine such as an excavator, a dozer, a loader, a backhoe, a motor grader, or any other earth moving machine. The machine 10 may include a linkage system 12, an implement 14 attachable to linkage system 12, one or more hydraulic actuators 16*a-c* interconnecting the linkage system 12, an operator interface 18, a power source 20, and at least one traction device 22.

The linkage system 12 may include any structural unit that supports movement of the implement 14. The linkage system 12 may include, for example, a stationary base frame 24, a boom 26, and a stick 28. The boom 26 may be pivotally connected to the frame 24, while the stick 28 may be pivotally connected to the boom 26 at a joint 30. The implement 14 may pivotally connect to the stick 28 at a joint 32. It is contemplated that the linkage system may alternatively include a different configuration and/or number of linkage members than the system depicted in FIG. 1.

Numerous different implements 14 may be attachable to the stick 28 and controllable via the operator interface 18. The implement 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. The implement 14 may be configured to pivot, rotate, slide, swing, lift, or move relative to machine 10 in any manner known in the art.

The operator interface 18 may be configured to receive input from an operator indicative of a desired movement of the machine 10, including the implement 14. More particularly, the operator interface 18 may include an operator interface device 34 such as, for example, a multi-axis joystick. The operator interface device 34 may be a proportional-type controller configured to position and/or orient the implement 14 and to produce an interface device position signal indicative of a desired movement of the implement 14. It is contemplated that additional and/or different operator interface devices may be included within operator interface 18 such as, for example, wheels, knobs, push-pull devices, switches, pedals, and other operator interface devices known in the art.

The power source 20 may be an engine such as, for example, a diesel engine, a gasoline engine, a gaseous fuel-power engine such as a natural gas engine, or any other engine known in the art. It is contemplated that power source 20 may alternatively embody another source of power such as a fuel cell, a power storage device, an electric or hydraulic motor, or another source of power known in the art.

The traction device 22 may include tracks located on each side of the machine 10. Alternatively, the traction device 22 may include wheels, belts, or other traction devices. Traction device 22 may or may not be steerable. It is contemplated that if the machine 10 embodies a stationary machine, the traction device 22 may be omitted.

Figure 2:
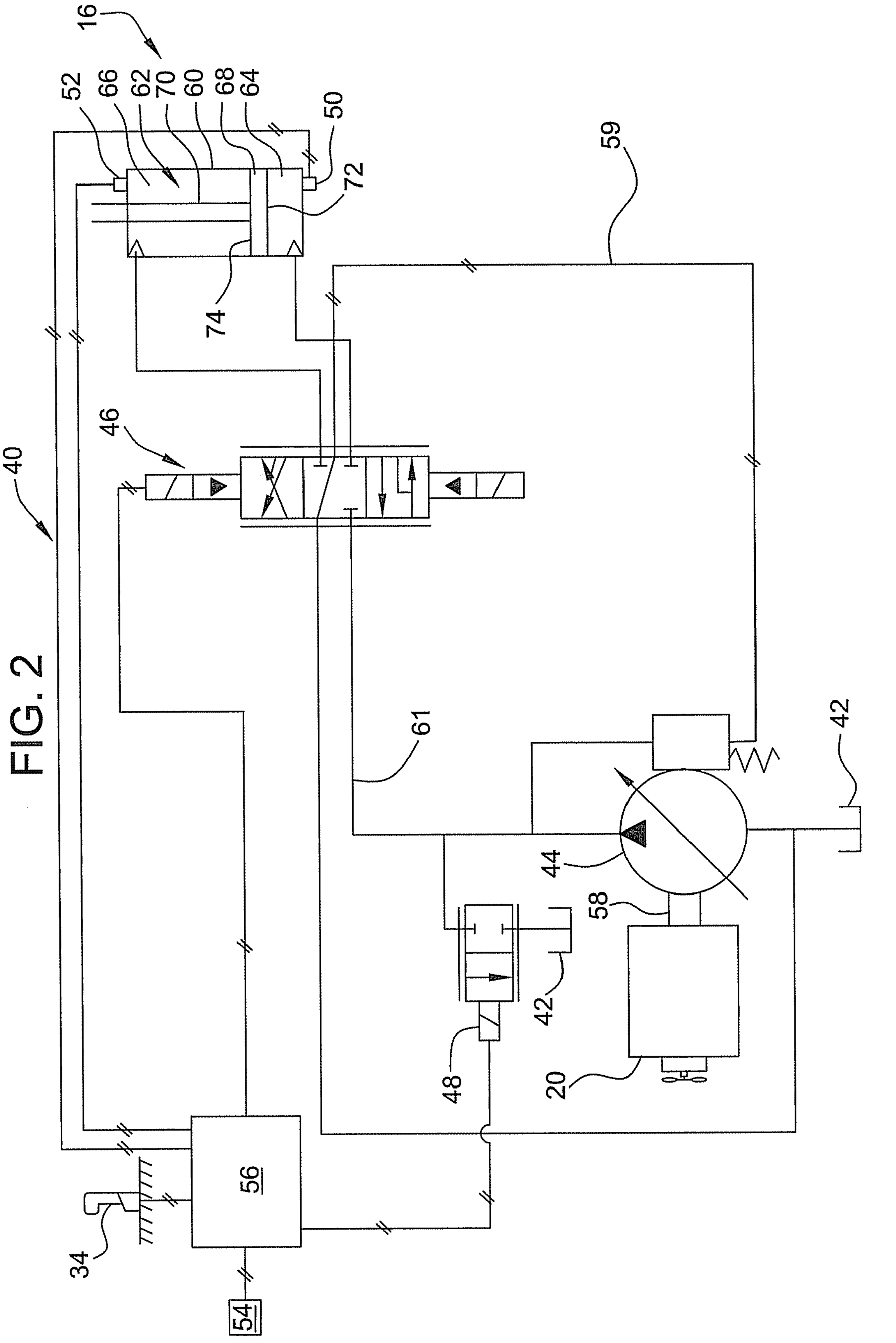
FIG. 2 is a schematic illustrating an exemplary hydraulic system for use in a machine such as illustrated in FIG. 1.

As illustrated in FIG. 2, the machine 10 may include a hydraulic system 40 having a plurality of fluid components that cooperate to move the implement 14. Specifically, the hydraulic system 40 may include a tank 42 for holding a supply of fluid, and a source 44 configured to pressurize the fluid and to provide a flow of the pressurized fluid to the hydraulic actuators 16*a-c*. While FIG. 1 depicts three actuators, identified as 16*a*, 16*b*, and 16*c*, for the purposes of simplicity, the hydraulic schematic of FIG. 2 depicts only one hydraulic actuator identified as 16. The hydraulic system 40 may include first and second valves 46, 48. The first valve 46 may be a directional valve 46 associated with each end of the hydraulic actuator 16 for directing the flow of pressurized fluid to the hydraulic actuator 16. The second valve 48 may be a bypass valve located between the tank 42 and the source 44.

The hydraulic system 40 also may include a head-end pressure sensor 50 and a rod-end pressure sensor 52 associated with the hydraulic actuator 16. The hydraulic system 40 may further include a linkage sensor 54 and a controller 56 in communication with the fluid components of hydraulic system 40 and the operator interface device 34. It is contemplated that hydraulic system 40 may include additional and/or different components such as, for example, accumulators, restrictive orifices, check valves, pressure relief valves, makeup valves, pressure-balancing passageways, temperature sensors, tool recognition devices, and other components known in the art.

The tank 42 may be a reservoir configured to hold a supply of fluid. The tank 42 may be in fluid communication with the source 44, the directional valve 46, and the bypass valve 48. The fluid may include, for example, a dedicated hydraulic oil, an engine lubrication oil, a transmission lubrication oil, or any other fluid known in the art. The hydraulic system 40 within the machine 10 may draw fluid from and return fluid to the tank 42. It is also contemplated that hydraulic system 40 may be connected to multiple separate fluid tanks.

The source 44 may be configured to produce a flow of pressurized fluid and may include a pump such as, for example, a load-sense variable displacement pump. The source 44 draws fluid from the tank 42 and provides fluid flow to the directional valve 46, which then directs the fluid flow to the actuator 16. The source 44 may be drivably connected to the power source 20 of the machine 10 by, for example, a countershaft 58, a belt, an electrical circuit, or in any other suitable manner. Alternatively, source 44 may be indirectly connected to the power source 20 via a torque converter, a gear box, or in any other manner known in the art. It is contemplated that multiple sources of pressurized fluid may be interconnected to supply pressurized fluid flow to the hydraulic system 40.

In operation, the source 44 may be a load-sense pump configured to maintain a constant pressure differential between the pressure indicated by a load sense line 59 and the pressure in a supply line 61, which fluidly connects the source 44 to the directional valve 46. For example, the load sense line 59 may extend between the directional valve 46 and the source 44 for transmitting, either electronically or hydro-mechanically, to the source 44 information regarding the magnitude of the load acting on the actuator 16. It should be appreciated that the load sense line 59 may extend between the actuator 16 and the source 44.

For example, in an embodiment, the load sense line 59 transmits a pressure value that represents the magnitude of the load acting on the actuator 16. When a load having a large magnitude acts on the actuator 16, the load sense line 59 transmits a correspondingly large pressure value to the source 44. In response, the displacement of the source 44 increases, thereby increasing the pressure in the supply line 61 so as to maintain the constant pressure differential between the pressure in the supply line 61 and the pressure indicated by the load-sense line 59. Likewise, when a load having a small magnitude acts on the actuator 16, the load-sense line 59 transmits a correspondingly small pressure value to the source 44. In response to the small pressure value, the displacement of the source 44 decreases, thereby decreasing pressure in the supply line 61 so as to maintain the constant pressure differential.

The hydraulic actuator 16 may be a fluid cylinder that interconnects the implement 14 and linkage system 12. It is contemplated that hydraulic actuators other than fluid cylinders may alternatively be implemented within hydraulic system 40 such as, for example, hydraulic motors or any other type of hydraulic actuator known in the art. As illustrated in FIG. 2, the hydraulic actuator 16 may include a tube 60 and a piston assembly 62 disposed within tube 60. One of the tube 60 and the piston assembly 62 may be pivotally connected between members of the linkage system 12 and/or implement 14. The hydraulic actuator 16 may include a first chamber 64 and a second chamber 66 separated by a piston 68. The first and second chambers 64, 66 may be selectively supplied with pressurized fluid from the source 44 and selectively drained of the fluid to cause the piston assembly 62 to displace within tube 60, thereby changing the effective length of the hydraulic actuator 16. This expansion and retraction of hydraulic actuator 16 may function to move the implement 14 and linkage system 12.

The piston assembly 62, as shown, includes the piston 68 axially aligned with, and disposed within, the tube 60, and a piston rod 70 connectable to the frame 24, the boom 26, the stick 28, or the implement 14. The piston 68 may include a first hydraulic surface 72 and a second hydraulic surface 74 opposite the first hydraulic surface 72. An imbalance of force caused by fluid pressure on the first and second hydraulic surfaces 72, 74 may result in movement of piston assembly 62 within tube 60. For example, a force on the first hydraulic surface 72 greater than a force on the second hydraulic surface 74 may cause the piston assembly 62 to expand out of the tube 60, thereby increasing the effective length of the hydraulic actuator 16. Similarly, when a force on the second hydraulic surface 74 is greater than a force on the first hydraulic surface 72, the piston assembly 62 may retract within tube 60, thereby decreasing the effective length of the hydraulic actuator 16. A flow rate of fluid into and out of the first and second chambers 64, 66 may determine the velocity of the hydraulic actuator 16, while a pressure of the fluid in contact with the first and second hydraulic surfaces 72 and 74 may determine an actuation force of the hydraulic actuator 16. A sealing member, such as an o-ring, may be connected to the piston 68 to restrict a flow of fluid between an internal wall of the tube 60 and an outer cylindrical surface of the piston 68.

The directional valve 46 may be disposed between the source 44 and the actuator 16 and between the tank 42 and the actuator 16. The directional valve 46 may be configured to regulate the flow of pressurized fluid to and from the first and second chambers 64, 66 of the actuator 16 in response to commands from the controller 56, which receives commands from the operator interface device 34. The directional valve 46 may move between a first-open position, a closed position, and a second-open position.

In the first-open position, the directional valve 46 directs fluid from the source 44 to first chamber 64 for expanding the hydraulic actuator 16 and moving the implement 14 in a first direction. When the actuator 16 is expanding, fluid exits the second chamber 66 and flows back to the directional valve 46, which then directs the fluid back to the tank 42. In the second-open position, the directional valve 46 directs fluid from the source 44 to the second chamber 66, thereby retracting the piston assembly 62 into the tube 60 of the actuator 16 and moving the implement 14 in a second direction. The retracting piston assembly 62 forces fluid out of the first chamber 64 and back to the directional valve 46, which then directs the fluid back to the tank 42. When in the closed position, the directional valve 46 blocks fluid from flowing from the source 44 to the actuator 16 and from the actuator 16 to the tank 42.

In the case where the source 44 is a load-sense pump and when the directional valve 46 is in either the first- or second-open position, more fluid flow is needed from the source 44 to maintain the pressure in the supply line 61. Accordingly, to maintain the constant pressure differential between the pressure in the supply line 61 and the pressure indicated by the load sense line 59, the displacement/speed of the source 44 increases so as to provide more fluid flow in the supply line 61 when the directional valve 46 is in either the first- or second-open position.

The directional valve 46 may include a proportional spring biased mechanism that is solenoid actuated and configured to move the directional valve 46 between the first-open, closed, and second-open positions. The directional valve 46 may be movable to any position between these positions to vary the rate of flow to and from the first and second chambers 64, 66 of the actuator 16, thereby affecting the velocity of actuator 16 and the velocity of the moving implement 14. It is contemplated that the directional valve 46 may alternatively be hydraulically actuated, mechanically actuated, pneumatically actuated, or actuated in any other suitable manner.

The bypass valve 48 may be fluidly connected to the supply line 61 for selectively permitting fluid to bypass the directional valve 46 and flow back to the tank 42. The bypass valve 48 may include a proportional spring biased valve mechanism that is solenoid actuated and configured to move between an open position at which fluid is allowed to flow back to tank 42, and a closed position at which fluid flow is blocked from flowing back to tank 42. It is contemplated that bypass valve 48 may alternatively be hydraulically actuated, mechanically actuated, pneumatically actuated, or actuated in any other suitable manner.

The bypass valve 48 may be movable to any position between the open and closed positions to vary the rate of flow back to tank 42, thereby affecting the displacement/speed of the source 44. The rate of flow to tank 42, which is controlled by the displacement of the bypass valve 48, is directly proportional to the displacement of the source 44. For example, in the case where the source 44 is a load-sense pump and when the bypass valve 48 is in the open position for allowing a rate of flow to tank 42, increased displacement from the source 44 is needed to provide a corresponding increase in the rate of flow in the supply line 61 so as to maintain the constant pressure differential between the pressure in the supply line 61 and the pressure indicated by the load sense line 59.

The controller 56 may embody a single microprocessor or multiple microprocessors that include a means for controlling an operation of the hydraulic system 40. Numerous commercially available microprocessors can be configured to perform the functions of the controller 56. It should be appreciated that the controller 56 could readily be embodied in a general machine microprocessor capable of controlling numerous machine functions. The controller 56 may include a memory, a secondary storage device, a processor, and any other components for running and executing an application. Various other circuits may be associated with the controller 56 such as power supply circuitry, signal conditioning circuitry, solenoid driver circuitry, and other types of circuitry.

The controller 56 may be configured to command the bypass valve 48 to proportionally move between the first and second positions for increasing and decreasing the displacement of the source 44. This may be useful, for example, when the source 44 is a load-sense pump. In such a case, when a load having a small magnitude acts on the implement 14, the load sense line 59 indicates a correspondingly small pressure. Accordingly, to maintain the constant pressure differential between the pressure in the supply line 61 and the pressure indicated by the load-sense line 59, the load-sense pump 44 operates at a low displacement.

This characteristic of load-sense pumps 44 can be disadvantageous because oftentimes, after completing a task and when no load is acting on the implement 14, an operator may want to rapidly shake the implement 14, thereby dislodging mud, dirt, clay, or debris from the implement 14. However, the load-sense pump 44, which is operating at a low displacement, provides fluid having a low flow rate to the actuator 16. Because the flow rate of the fluid entering and exiting the first and second chambers 64, 66 of the actuator 16 determines the velocity at which actuator 16 expands and retracts, in conditions of low fluid flow rates to the actuator 16, the actuator 16 may not expand and retract fast enough to rapidly shake the implement 14. Accordingly, the movements of the implement 14 lag behind the operator's rapid commands.

To prevent this lag from occurring when a small-magnitude load acts on the implement 14, the controller 56, upon identifying a pattern of input commands that indicate a request for rapid shaking, is configured to automatically initiate a mode for controlling the displacement of the source 44. For example, the controller 56 may initiate a destroke-reduction mode and/or a rapid-movement mode.

Figure 3:
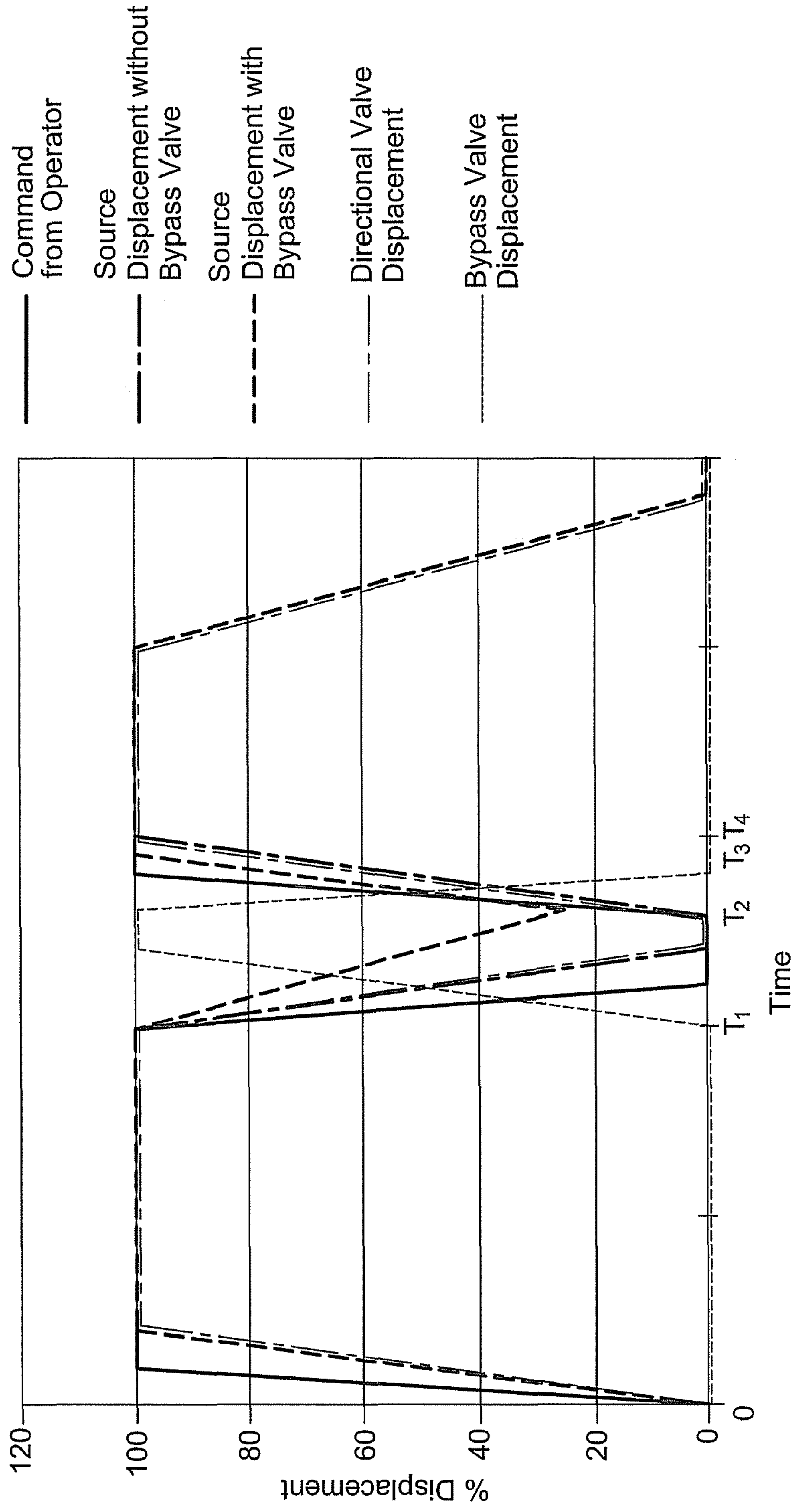
FIG. 3 is a graph illustrating an exemplary mode executed by a controller of the hydraulic system of FIG. 2.

FIG. 3 provides a graphical illustration of the displacement of various components of the hydraulic system 40 when the controller 56 is operating in the destroke-reduction mode, which is a mode for reducing the destroke rate of the source 44 when an operator is attempting to rapidly shake the implement 14. At time=0, the operator inputs a command, e.g., the operator moves the joystick, indicating a request for movement of the implement 14. In response, the controller 56 instructs the directional valve 46 to move from the closed position to one of the first- and second-open positions, thereby increasing the displacement of the source 44 to 100% so as to provide fluid flow to the actuator 16 for moving the implement 14 in a manner consistent with the inputted command. At time=$T_1$, the operator retracts the command, e.g., the operator moves the joystick back to a neutral position, thereby indicating a request to discontinue movement of the implement 14. In response, the controller 56 instructs the direction valve 46 to move back to the closed position.

Accordingly, within the time elapsed between time=0 and time=$T_1$, the operator inputted a pattern of commands indicating a request that the implement 14 move and then discontinue moving. The controller 56 is configured to recognize this pattern of commands as indicating an operator-request for rapid shaking of the implement and, in response, initiate the destroke-reduction mode. It is contemplated that $T_1$ can be defined according to user preferences. For example, $T_1$ can be one-quarter or one-half of a second. It is contemplated that that controller 56 can be configured to recognize other patterns of commands as indicating an operator-request for rapid shaking of the implement.

When operating in the destroke-reduction mode and when the operator inputs a command indicating a request to discontinue movement of the implement 14, the controller 56 is configured close the directional valve 46 and open the bypass valve 48. Opening the bypass valve 48 reduces the rate of decrease in the displacement of the source 44 because, in the case where the source 44 is a load-sense pump, the displacement of the source 44 must remain sufficiently high to maintain the pressure differential between the pressure in the supply line 61 and the pressure indicated by the load-sense line 59. If the bypass valve 48 were not open when the directional valve 46 is closed, the source 44 would be forced to operate at a low displacement for maintaining the constant pressure differential between the pressure in the supply line 61 and the pressure indicated by the load-sense line 59. This concept is illustrated in FIG. 3, where at time=$T_1$, the operator inputs a command indicating a request for discontinuing movement of the implement 14. In response to this command, the source displacement with the controller operated bypass valve 48 decreases to approximately 25%, whereas the source displacement without the controller operated bypass valve 48 decreases to approximately 0%.

As a result, when the operator inputs a subsequent command indicating a request for movement of the implement 14, the source displacement with the controller operated bypass valve 48 will obtain 100% displacement in less time than the source displacement without the controller operated bypass valve 48. This is also illustrated in FIG. 3, where at time=$T_2$, the operator inputs a command indicating a request for movement of the implement 14 and, in response to this command, the source displacement with the controller operated bypass valve 48 obtains 100% displacement at $T_3$, whereas the source 44 displacement without the controller operated bypass valve 48 obtains 100% displacement later, at $T_4$. As such, the directional valve 46, when receiving fluid flow from the source 44 operating in combination with the controller operated bypass valve 48, is capable of directing fluid flow at a high flow rate between the first and second chambers 64, 66 of the actuator 16, thereby providing rapid back-and-forth movement of the piston 68 and the implement 14.

In an embodiment, the controller 56 is configured to operate in a rapid-movement mode which can increase the displacement of the source 44. The controller 56, when operating in the rapid-movement mode, is configured to proportionally open the bypass valve 48 to maintain the source 44 at about 50% of the maximum displacement when the operator inputs a command indicating a request that the implement 14 remain stationary, e.g., when the joystick is in the neutral position and when the directional valve 46 is in the closed position. Accordingly, when an operator inputs a pattern of commands indicating a request for rapid shaking of the implement 14, the source 44, operating at 50% displacement, can quickly increase to 100% displacement for providing an adequate flow rate of fluid flow in and out of first and second chambers 64 and 66 of the actuator 16. It is contemplated that the bypass valve 48 may be proportionally opened or closed, e.g., the displacement of the bypass valve may be proportionally increased or decreased, for maintaining the source 44 at a standby displacement of less or more than 50%.

Figure 4:
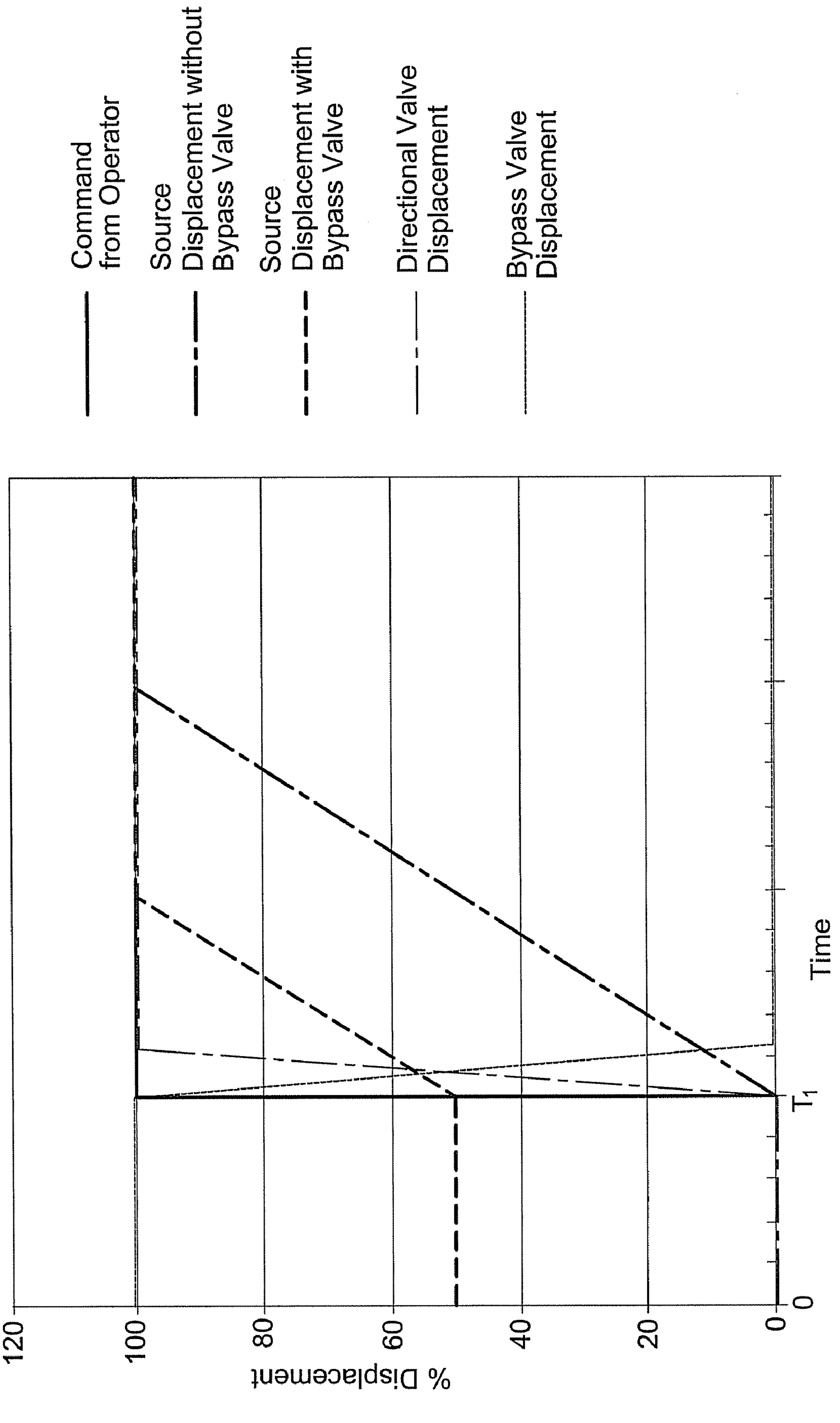
FIG. 4 is a graph illustrating another exemplary mode executed by the controller of the hydraulic system of FIG. 2.

FIG. 4 provides a graphical illustration of the displacement of various components of the hydraulic system 40 when the controller 56 is operating in the rapid-movement mode. The controller 56 is configured to proportionally open the bypass valve 48 when the directional valve 46 moves to the closed position, e.g., when the implement 14 is stationary. Accordingly, at time=0, when the operator's command indicates a request that the implement 14 remain stationary, the controller 56 maintains the bypass valve 48 in an open position and the directional valve 46 in a closed position. As shown in FIG. 4, at time=0, the open bypass valve 48 forces the source 44 to operate at a displacement of about 50% so as to maintain the constant pressure differential between the pressure in the supply line 61 and the pressure indicated by the load-sense line 59. Also illustrated in FIG. 4 is the displacement of the source 44 without the controller 56 operated bypass valve 48. As shown in FIG. 4, without the bypass valve 48, the displacement of the source 44 at time=0 is approximately 0%. The displacement of the source 44 operating without the bypass valve 48 is low because only a small amount of fluid flow is required to maintain the constant pressure differential when no load is acting on the implement 14 and when the directional valve 46 is in the closed position.

At time=$T_1$, the operator inputs a command indicating a request for movement of the implement 14. In response, controller 56 moves the directional valve 46 to either the first- or second-open position and moves the bypass valve 48 to the closed position. Closing the bypass valve 48 forces all of the flow in the supply line 61 to the directional valve 46, which directs the flow to the actuator 16. Because the source 44 is operating at 50% displacement when the directional valve 46 opens, the source 44 increases to 100% displacement in less time than the source 44 without the controller operated bypass valve 48. Accordingly, as illustrated in FIG. 4, the source 44, and the actuator 16 which receives fluid flow from the source 44, are more responsive to operator commands, e.g., commands requesting rapid movement of the implement, when the hydraulic system 40 includes the controller operated bypass valve 48.

In operation, the controller 56, when programmed to operate the bypass valve 48 pursuant to the destroke-reduction mode and/or the rapid-movement mode described herein, causes the source 44 to be capable of quickly providing sufficient rates of fluid flow to rapidly shale the implement 14. Thus, for example, in the case of an excavator or backhoe having a load-sense pump and a bucket used for moving earth, the excavator or backhoe may, upon the command of an operator and without first having to manually open a binary bypass valve, rapidly shake the bucket at a time when the bucket is substantially empty to dislodge dirt, mud, clay, or debris from the bucket.

INDUSTRIAL APPLICABILITY

The industrial applicability of the system and method described herein will be readily appreciated from the foregoing discussion. A technique is described wherein the rate of flow to an actuator such as for rapid shaking of an implement is controlled to provide an adequate rate of flow to the actuator within a small amount of time.

The disclosed hydraulic system and method are applicable to any hydraulically actuated machine that includes a fluidly connected hydraulic actuator where it is desirable to provide fluid flow to the actuator for rapidly shaking an implement. The disclosed hydraulic system includes a controller that applies one or more modes to control a rate of flow to the actuator when an operator requests rapid movement of an implement. In this manner, an adequate rate of flow is available for rapid shaking, while minimizing unnecessary and wasteful displacement from a source, such as a pump.

During operation of the machine 10, a machine operator manipulates the operator interface device 34 to create a desired rapid shaking of the implement 14. Throughout this process, the operator interface device 34 generates signals indicative of desired flow rates of fluid supplied to hydraulic actuators 16*a-c* to accomplish the desired shaking. The controller 56, upon identifying signals indicative of a request for rapid shaking, executes the destroke-reduction mode and/or the rapid-movement mode, as described with reference to FIGS. 3 and 4, to provide an adequate rate of flow to the hydraulic actuators 16*a-c* for moving the implement 14 as requested by the operator.

It will be appreciated that the foregoing description provides examples of the disclosed system and technique. However, it is contemplated that other implementations of the disclosure may differ in detail from the foregoing examples. All references to the invention or examples thereof are intended to reference the particular example being discussed at that point and are not intended to imply any limitation as to the scope of the invention generally. All language of distinction and disparagement with respect to certain features is intended to indicate a lack of preference for those features, but not to exclude such from the scope of the invention entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A fluid system for use with a machine that employs an actuator for moving an implement and which provides for rapid movement of the implement, the fluid system comprising:

a tank for storing fluid;

a load sense pump fluidly connected to the tank for drawing fluid from the tank and providing fluid flow in the system;

a first valve fluidly connected between the pump and the actuator and between the tank and the actuator, the first valve configured to move between a plurality of open positions for directing fluid from the pump to the actuator and from the actuator to the tank, and a closed position that blocks fluid from flowing from the pump to the actuator and from the actuator to the tank;

a load sense line connected to the pump, wherein the pressure indicated by the load sense line represents the magnitude of a load acting on the implement;

a supply line fluidly connected between the pump and the first valve in which the rate of fluid flow is varied by the pump so as to maintain a constant pressure differential between the pressure in the supply line and the pressure indicated by the load sense line;

a second valve fluidly connected to the supply line for selectively permitting fluid to bypass the first valve and flow back to the tank;

an operator input device for enabling an operator to control the movement of the implement by inputting a plurality of commands that specify movement of the first valve between the positions for directing fluid; and a controller configured to monitor the commands received from the operator input device and selectively activate a mode that provides for rapid movement of the implement when the controller detects rapid variations in the commands from the operator input device;

wherein the controller operating in the mode that provides for rapid movement of the implement activates the second valve based on a status of the first valve, the activation of the second valve including proportionately opening the second valve when the first valve moves to the closed position and proportionately closing the second valve when the first valve moves to an open position, wherein the activation of the second valve causes the pump to increase or maintain the rate of fluid flow in the supply line so as to maintain the constant pressure differential between the supply line and the load sense line.

2. A fluid system for use with a machine that employs an actuator for moving an implement and which provides for rapid movement of the implement, wherein the fluid system includes a source for providing fluid flow to the actuator through a supply line, and a main valve positioned in the supply line to control the fluid flow in the supply line, the fluid system comprising:

an operator input device that controls the movement of the implement, the movement of the implement being controlled by moving the main valve between a plurality of open positions and a closed position in response to movements of the operator input device, the plurality of open positions being positions in which fluid flow is allowed between the source and the actuator, and the closed position being a position in which fluid flow is prevented between the source and the actuator; and a controller configured to monitor the movements of the operator input device and selectively activate a mode that provides for rapid movement of the implement when the controller detects a pattern of operator input device movements that indicates an operator-request for rapid movement of the implement, wherein, in the mode that provides for rapid movement of the implement, the controller operates a bypass valve in concert with the main valve, the operation of the bypass valve including proportionately opening the bypass valve when the main valve moves to the closed position and proportionately closing the bypass valve when the main valve moves to an open position, the bypass valve being configured to selectively permit fluid in the supply line to bypass the main valve and flow to a tank.

3. The fluid system of claim 2, wherein the mode that provides for rapid movement of the implement is a destroke-reduction mode, the destroke-reduction mode being a mode that decreases a rate of displacement of the source.

4. The fluid system of claim 3, wherein the controller operating in the destroke-reduction mode proportionately opens the bypass valve when the main valve moves to the closed position.

5. The fluid system of claim 2, wherein the source is a load-sense pump.

6. The fluid system of claim 5, further comprising:

a load sensing line connected to the load-sense pump, wherein pressure in the load sensing line represents the magnitude of a load acting on the implement and the load-sense pump varies the rate of fluid flow so as to maintain a constant pressure differential between the pressure in the supply line and the pressure indicated by the load sense line.

7. The fluid system of claim 6, wherein opening the bypass valve causes the load-sense pump to increase or maintain the rate of fluid flow in the supply line so as to maintain the constant pressure differential between the pressure in the supply line and the pressure in the load sensing line.

8. The fluid system of claim 7, wherein the mode that provides for rapid movement of the implement is a destroke-reduction mode, the destroke-reduction mode being a mode that decreases a rate of displacement of the load-sense pump.

9. The fluid system of claim 8, wherein the controller operating in the destroke-reduction mode further opens the bypass valve when the main valve moves closer to the closed position.

10. The fluid system of claim 2, wherein the mode that provides for rapid movement of the implement is a rapid-movement mode, the rapid-movement mode being a mode that decreases a displacement of the source.

11. The fluid system of claim 10, wherein the controller operating in the rapid-movement mode maintains the displacement of the source at 50% of a maximum displacement during a period when no commands are being received from the operator input device.

12. The fluid system of claim 11, wherein the controller operating in the rapid-movement mode maintains the displacement of the source at 50% of the maximum displacement by proportionally opening the bypass valve.

13. A method of controlling a fluid system of a machine, including an implement, to provide for rapid movement of the implement, the hydraulic system including a load-sense pump fluidly coupled to an actuator of the implement through a supply line, a load sense line that indicates a magnitude of load acting on the implement, a main valve positioned in the supply line to control fluid flow between the source and the actuator, a bypass valve configured to selectively permit fluid in the supply line to bypass the main valve and flow to a tank, an operator input device that controls the movement of the implement by moving the main valve between a plurality of open positions and a closed position in response to a movement of the operator input device, the plurality of open positions being positions in which fluid flow is allowed between the pump and the actuator and the closed position being a position in which fluid flow is prevented between the pump and the actuator, and a controller that operates the main valve to operate the implement based on the movements of the operator input device and initiates a mode that provides for rapid movement of the implement based on a pattern of movements of the operator input device, the method comprising:

establishing an indicator characterized by a pattern of movements of the operator input device as a request for rapid movement of the implement;

monitoring the movements of the operator input device to detect for an occurrence of the indicator;

identifying the occurrence of the indicator; and initiating a mode that provides for rapid movement of the implement at the occurrence of an indicator, wherein in the mode that provides for rapid movement of the implement, the bypass valve is proportionately opened when the main valve moves to the closed position and the bypass valve is proportionately closed when the main valve moves to an open position.

14. The method of claim 13, wherein the pattern of input commands that indicate the request for rapid movement of the implement is a rapid back-and-forth cycling of a joystick by an operator.

15. The method of claim 13, wherein the mode that provides for rapid movement of the implement is a destroke-reduction mode, the destroke-reduction mode being a mode that decreases a rate of displacement of the pump.

16. The method of claim 15, wherein the controller operating in the destroke-reduction mode decreases the rate of displacement of the pump by proportionally opening the bypass valve in response to an operator closing the main valve via the operator input device, wherein the opening bypass valve allows fluid flow from the supply line to the tank.

17. The method of claim 13, wherein the mode that provides for rapid movement of the implement is a rapid-movement mode, the rapid-movement mode being a mode that decreases a displacement of the pump.

18. The method of claim 17, wherein the controller operating in the rapid-movement mode maintains the displacement of the pump at 50% of a maximum displacement during a period when no commands are being received from the operator input device, wherein the controller maintains the displacement of the pump at 50% of the maximum displacement by proportionally opening the bypass valve for allowing fluid to flow back to a tank.

19. The fluid system of claim 2, wherein the bypass valve remains closed when the mode that provides for rapid movement of the implement is not activated.

20. The method of claim 13, wherein the bypass valve remains closed when the mode that provides for rapid movement of the implement is not initiated.

* * * * *